(12) United States Patent
Mayer

(10) Patent No.: US 11,787,082 B2
(45) Date of Patent: Oct. 17, 2023

(54) REINFORCEMENT OF 3D-PRINTED CONCRETE BODIES

(71) Applicant: PERI SE, Weissenhorn (DE)

(72) Inventor: Juergen Mayer, Deisenhausen (DE)

(73) Assignee: PERI SE, Weissenhorn (DE)

( * ) Notice: Subject to any disclaimer, the term of this patent is extended or adjusted under 35 U.S.C. 154(b) by 93 days.

(21) Appl. No.: 16/763,136

(22) PCT Filed: Nov. 9, 2018

(86) PCT No.: PCT/EP2018/080754
§ 371 (c)(1),
(2) Date: May 11, 2020

(87) PCT Pub. No.: WO2019/092178
PCT Pub. Date: May 16, 2019

(65) Prior Publication Data
US 2020/0269463 A1  Aug. 27, 2020

(30) Foreign Application Priority Data

Nov. 10, 2017  (DE) ..................... 10 2017 126 343.8

(51) Int. Cl.
| | | |
|---|---|---|
| *B28B 23/00* | (2006.01) | |
| *B28B 1/00* | (2006.01) | |
| *B33Y 70/00* | (2020.01) | |
| *B28B 23/02* | (2006.01) | |

(Continued)

(52) U.S. Cl.
CPC .......... *B28B 1/001* (2013.01); *B28B 23/0006* (2013.01); *B28B 23/02* (2013.01); *B33Y 70/00* (2014.12); *B33Y 10/00* (2014.12); *B33Y 80/00* (2014.12)

(58) Field of Classification Search
None
See application file for complete search history.

(56) References Cited

U.S. PATENT DOCUMENTS

| | | | |
|---|---|---|---|
| 2017/0021527 A1* | 1/2017 | Grivetti | ............... E04G 21/0436 |
| 2017/0129153 A1 | 5/2017 | Koivuharju | |
| 2017/0203468 A1 | 7/2017 | Sherman | |

FOREIGN PATENT DOCUMENTS

| | | | |
|---|---|---|---|
| CN | 106313272 | | 1/2017 |
| CN | 106313272 A | * | 1/2017 |

(Continued)

*Primary Examiner* — Mohammad M Ameen
(74) *Attorney, Agent, or Firm* — Sleman & Lund LLP

(57) ABSTRACT

A method for producing a component from hardenable material, wherein, in a first method step, at least one layer of the material is printed in a 3D printing process, in a second method step, multiple similar reinforcing elements are introduced into the layer(s) and the two method steps are cyclically repeated until the component is completed, characterized in that, with the exception of the two bottommost and the topmost layers, each reinforcing element extends over at least three layers, and the reinforcing elements are arranged in strands which extend through all the layers and have, in each layer, at least three reinforcing elements, the lateral distance (A) of these reinforcing elements from each other within a strand being a maximum of five times the largest lateral extent (D) of a reinforcing element.

6 Claims, 2 Drawing Sheets

(51) Int. Cl.
*B33Y 10/00* (2015.01)
*B33Y 80/00* (2015.01)

(56) References Cited

FOREIGN PATENT DOCUMENTS

DE 102005062406 A1 * 6/2007
WO 2005070657 8/2005

* cited by examiner

REINFORCEMENT OF 3D-PRINTED CONCRETE BODIES

FIELD OF THE INVENTION

The invention relates to a method for producing a component from hardenable material.

BACKGROUND OF THE INVENTION

In industrialized countries, the production of structures from concrete is still largely based on manual workmanship. In principle, such structures or parts of these structures can be produced in two different ways. In one approach, work can be done on site with formwork, in which cast-in-place concrete is then cast, with it being possible for reinforcements to be additionally inserted for load-bearing parts. There is then a wait until the concrete is partially or completely hardened, at which point the formwork can be removed, cleaned, and then re-used. The method is time-consuming and requires there to be a large number of workers on the building site.

Another method involves casting the concrete parts of the structure in advance in a factory, i.e. constructing these parts as prefabricated parts and delivering them to the building site as such. In this method, not only walls or floor components but also entire room modules can be produced from concrete as prefabricated parts and delivered to the building site. This method is more cost-effective, but it has a high level of standardization and is thus only suitable for producing a large number of identical or similar structures or for very large structures that require a large number of identical room modules. A customized design is again only possible at a high cost.

Proceeding from these known techniques, in the production of structures from concrete, what is known as an additive production method has evolved recently, namely the 3D printing of concrete. In this process, the structure is designed on a computer and the data are then sent to a printer. The printer is a fully automatic gantry robot, which is larger than the building or building part to be constructed. Instead of gantry robots, multi-axis or shelf-mounted robots or mobile robots can also be used. Said robots comprise a print head and concrete feed lines, via which the cast-in-place concrete is fed to the print head. This print head then casts the structure to be constructed and/or the walls thereof in a plurality of layers one on top of the other, with each layer having a thickness of between 1 and 10 cm. The concrete used here is viscous enough to maintain the stability until it has fully hardened, but at least until it has superficially hardened. In this way, the print head casts a wall in a plurality of layers arranged one on top of the other.

When constructing structures by means of 3D printing methods, the reinforcement of the walls is a problem. Complete steel frames or similar reinforcement elements can be inserted in principle, but this can only take place when the wall is printed at least in part, since the reinforcement elements would otherwise disrupt or prevent the movement of the print head. If, however, one waits until the wall is completely printed, the lower layers of the concrete are already completely or largely hardened, and therefore no further reinforcement elements can be inserted retroactively.

CN 106313272 A describes a 3D printing method for producing concrete structures, wherein the concrete is reinforced with fiber materials and two print heads are used, one of which prints the concrete and the other prints steel elements. In this process, the inserted steel elements each extend over two layers of concrete that are on top of one another and therefore connect said layers.

It is a drawback here that it is only possible to connect adjacent layers of concrete at points, but extensive reinforcement, as in conventional production methods e.g. using steel mats, is not possible.

WO 2005070657 A1 describes a method for producing a wall, wherein lost formwork, without vertical reinforcement elements, is produced in a 3D printing method. The reinforcement elements are inserted into the space between the two outer formwork elements and are filled with concrete.

In this process, it has disadvantageously been found that, in the production method, the formwork is first printed and reinforcement elements are inserted at a distance therefrom.

SUMMARY OF THE INVENTION

The problem addressed is to configure a method for producing a component from hardenable material, in particular concrete, such that the reinforcement thereof withstands high loads and in which the reinforcement can be inserted into the walls to be formed in a simple manner.

BRIEF DESCRIPTION OF THE DRAWINGS

Some embodiments of the invention are explained in greater detail in the following with reference to the accompanying drawings, in which.

DETAILED DESCRIPTION

Figure 1:
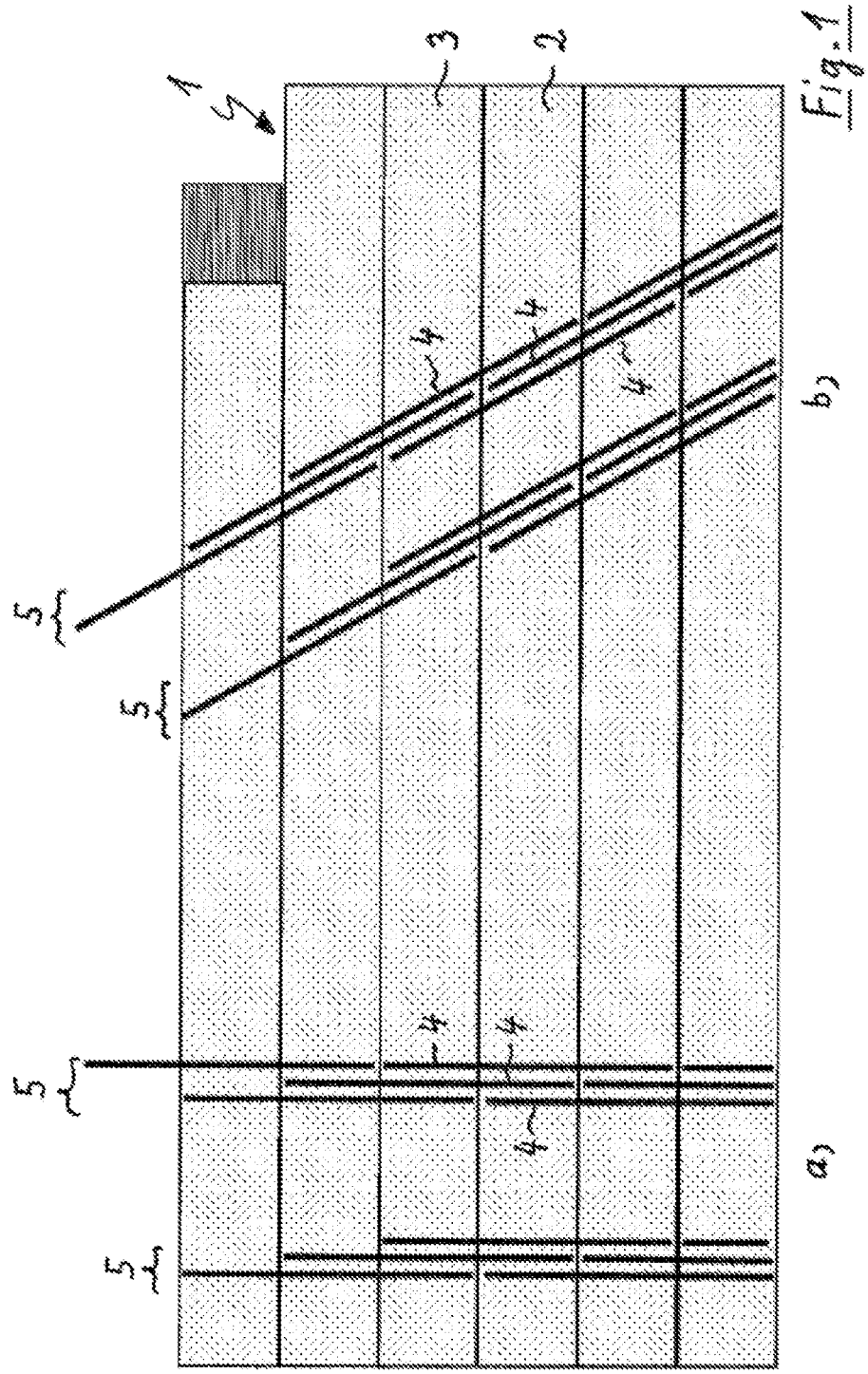
FIG. 1: is a cross section through a partially constructed component according to the claimed method in a first variant (a) and a second variant (b)

For carrying out the method according to the invention, a 3D printer, e.g. in the form of a fully automatic gantry robot, is used, in this respect in a manner known per se, which robot can print a wall or a complete room module or other vertical units of a structure in successive layers. FIG. 1 shows a component as it is being produced, which consists of a plurality of layers of concrete that are printed one on top of the other, with two layers being provided with reference signs 2 and 3 by way of example and the uppermost layer shown still being in the process of being produced, i.e. during the printing process.

FIG. 1 shows two variants of the insertion of reinforcement elements 4 into the layers 2 and 3 of the component 1.

In both variants shown, the following method steps are repeated cyclically until the structure is complete. In a first method step, a layer 2 or 3 of the hardenable material, in this case concrete, is applied in a 3D printing method and, in a second method step, a plurality of similar reinforcement elements 4 are inserted into the layers 2 and 3. Both method steps are repeated cyclically until the component 1 is complete. Each reinforcement element 4 consists either of a rigid material, in particular metal, e.g. steel, and can be inserted into the not yet hardened layers 2 and/or 3 of the hardenable material once it has been printed, or, alternatively, each reinforcement element 4 consists of a flexible material, e.g. a high-tensile fiber, e.g. made of Kevlar, and is then inserted into the not yet hardened layers 2 and/or 3 of the hardenable material by means of a guide pin.

Here, each reinforcement element 4 extends over at least three layers 2 and/or 3 and the reinforcement elements 4 are arranged in strands 5, with each strand extending through all the layers 2 and 3. Each strand 5 comprises at least three reinforcement elements 4 in each layer 2 and 3. In the embodiment shown, each reinforcement element 4 extends over three layers, with the strand 5 being formed such that the adjacent reinforcement element 4 extends over the three layers and the one indirectly positioned thereover, and the next reinforcement elements 4 extend over the next three layers that are positioned immediately thereabove. The strand 5 of reinforcement elements 4 thus comprises three adjacent reinforcement elements 4 in each layer 2 and 3.

In the variant (a) shown on the left of FIG. 1, the strands (5) of reinforcement elements 4 extend perpendicularly to the layers 2 and 3, and in the variant (b) shown on the right in FIG. 1, the strands 5 of reinforcement elements 4 extend at an angle of approx. 60° to the layers 2 and 3. Other angles, preferably between 10° and 90°, are possible and are advantageous depending on the field of application.

Figure 2:
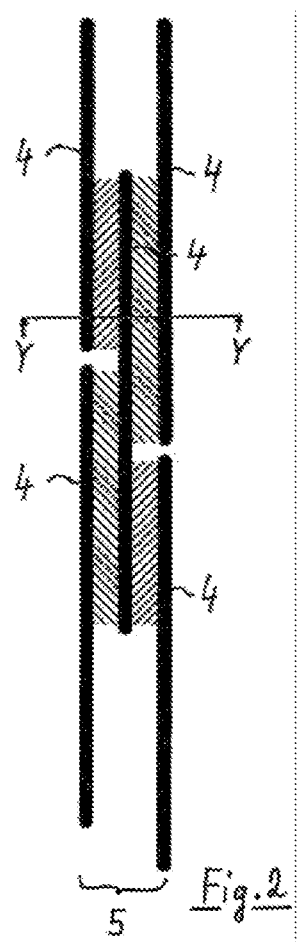
FIG. 2: is an enlarged view of adjacent reinforcement elements with schematically shown force transmission.
Figure 3:
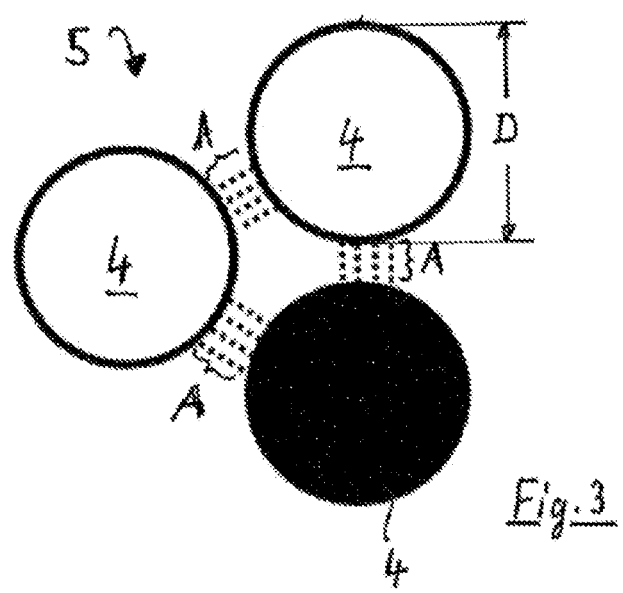
FIG. 3: is a plan view of the reinforcement elements shown in FIG. 2 along the line Y-Y with schematically shown force transmission.

The precise arrangement of the reinforcement elements 4 forming a strand 5 is shown in FIGS. 2 and 3, with FIG. 3 being a cross section through the line Y-Y in FIG. 2. In both figures, the flow of force between the adjacent reinforcement elements 4 within a strand 5 is shown by shading and by dashed lines, respectively. The lateral spacing A between adjacent reinforcement elements 4 within a strand 5 is as small as possible and, in the embodiment shown, is considerably smaller than the diameter D of each reinforcement element 4. At most, it should be five times this diameter D, but ideally should have as low a value as possible in order to optimize the flow of force or force transmission. A dense arrangement of the reinforcement elements 4 within a strand 5, as shown in FIGS. 2 and 3, results in an improved flow of force or improved force transmission through the concrete therebetween, as shown by shading and dashed lines in FIGS. 2 and 3, respectively.

The method according to the invention can be implemented both using rigid reinforcement elements and using flexible reinforcement elements, which are then inserted into the layers 2 and 3 by means of a guide pin.

In an alternative embodiment (not shown), instead of the bar-shaped reinforcement elements 4, elongate loops can also be used which extend over a plurality of layers 2 and 3. These loops can also consist of a rigid material, e.g. metal, or a flexible material, e.g. Kevlar, and can be inserted both perpendicularly to the layers 2 and 3 and at an angle to the layers 2 and 3, similarly to variants (a) and (b) in FIG. 1.

The method is also suitable for hardening materials other than concrete, in particular thixotropic materials.

There are various variants for the approach to pushing in the reinforcement elements 4. The reinforcement elements 4 may be completely pushed into the layers 2 and/or 3 therebelow made of concrete before the next layer is applied by the print head. In this case, the print head can apply the next layer of concrete without being obstructed at all by protruding reinforcement elements. Alternatively, the reinforcement elements can only be guided through the uppermost layer or through the two uppermost layers or through a plurality of upper layers of concrete, with a part of the reinforcement elements then projecting upwards. In this case, a print head having a cut-out for the protruding reinforcement elements is preferably used in order not to damage or pull out said reinforcement elements.

An alternative approach consists in manufacturing the reinforcement elements from a flexible, elastically yielding material if they protrude from the uppermost layer of the concrete when the next layer is being printed. In this case, the reinforcement elements can yield when the print head travels thereover and can elastically resiliently return to their initial position afterwards. A suitable material for corresponding reinforcement elements is spring steel, for example.

The method according to the invention and the component manufactured thereby have the advantage of a considerably closer connection of the reinforcement elements and considerably stronger reinforcement, since the strands 5 made up of individual reinforcement elements 4 can achieve a similar effect to that achieved in conventional concrete casting by using a steel mat. By forming strands from individual reinforcement elements, as claimed according to the invention, even in 3D printing, in which a continuous steel mat cannot be used, it is possible to achieve the same or similar strength values as those achieved when using continuous structural steel mats in a concrete casting method.

The invention claimed is:

1. A component made of hardenable material, comprising:
a plurality of layers produced in a 3D printing method; and
reinforcement elements connecting said plurality of layers, wherein, with the exception of two lowermost and uppermost layers, each reinforcement element extends over at least three layers, and the reinforcement elements are arranged in strands which extend through all the plurality of layers and comprise at least three reinforcement elements in each layer, the lateral spacing (A) between reinforcement elements within one strand is smaller than the greatest lateral extension (D) of a reinforcement element, wherein the reinforcement elements are designed as elongate loops.

2. The component according to claim 1, wherein the hardenable material is concrete.

3. The component according to claim 1, wherein the reinforcement elements consist of a rigid material.

4. The component according to claim 1, wherein the reinforcement elements consist of a flexible material.

5. The component according to claim 1, wherein the strands extend at right angles to the layers.

6. The component according to claim 1, wherein the strands extend at an angle of between 90° and 45° relative to the layers.

* * * * *